United States Patent [19] [11] Patent Number: 4,508,019
Kabele et al. [45] Date of Patent: Apr. 2, 1985

[54] REDUCED IMPACT PISTON ASSEMBLY

[75] Inventors: Dennis F. Kabele, Cedar Falls; Herbert J. Hauser, Jr., Waterloo, both of Iowa

[73] Assignee: Deere & Company, Moline, Ill.

[21] Appl. No.: 362,816

[22] Filed: Mar. 29, 1982

[51] Int. Cl.³ .............................................. F01B 31/10
[52] U.S. Cl. .................................. 92/158; 92/165 PR; 92/177; 92/216; 92/219; 92/188; 92/247
[58] Field of Search ................. 92/187, 188, 189, 191, 92/200, 247, 177, 162 R, 162 P, 158, 165 PR, 1, 193, 255, 216, 218, 219; 403/151, 154, 155

[56] References Cited

U.S. PATENT DOCUMENTS

| 774,186 | 11/1904 | Ladd | 92/188 |
| 1,366,415 | 1/1921 | Pearson | 92/193 |
| 1,381,260 | 6/1921 | Watson | 403/154 |
| 1,438,132 | 12/1922 | Nelson | 92/187 |
| 1,595,613 | 10/1926 | Mullern | 92/189 |
| 1,838,901 | 12/1931 | Blackmore | 403/154 |
| 2,049,922 | 8/1936 | Nienow | 309/15 |
| 2,086,667 | 7/1937 | Nelson | 309/13 |
| 2,208,782 | 7/1940 | Workman | 309/5 |
| 2,255,217 | 9/1941 | Hiyl | 403/155 |
| 2,267,724 | 12/1941 | Fahlman | 309/14 |
| 2,289,994 | 7/1942 | Pillar | 309/29 |
| 2,322,138 | 6/1943 | Jenny | 403/155 |
| 2,422,327 | 6/1947 | Winslow | 403/154 |
| 2,849,266 | 8/1958 | Glöckl | 403/155 |
| 2,966,382 | 12/1960 | Olsen | 309/5 |
| 3,061,175 | 10/1962 | Schmidt | 92/158 |
| 3,115,070 | 12/1963 | Tsang | 92/212 |
| 3,521,531 | 7/1970 | Kaesemodel | 92/158 |
| 3,805,677 | 4/1974 | Clary et al. | 92/186 |
| 4,158,328 | 6/1979 | Beardmore | 92/212 |
| 4,207,808 | 6/1980 | Eisbett et al. | 92/158 |

FOREIGN PATENT DOCUMENTS

| 446137 | 6/1927 | Fed. Rep. of Germany | 92/188 |
| 525968 | 5/1931 | Fed. Rep. of Germany | 92/188 |
| 2556465 | 6/1977 | Fed. Rep. of Germany | 92/158 |
| 136457 | 11/1929 | Switzerland | 92/188 |
| 215957 | 5/1924 | United Kingdom | 92/187 |
| 881353 | 12/1961 | United Kingdom | 92/188 |

Primary Examiner—Sheldon J. Richter
Assistant Examiner—Randolph A. Smith

[57] ABSTRACT

A reduced impact piston assembly including a cylindrical body with a cavity formed therein and having a cross-bore formed therethrough which intersects the cavity. The cross-bore receives a piston pin which has an exposed intermediate portion aligned with the cavity for attachment of a connecting rod thereto. A wide groove is formed about the outer circumference of the cylindrical body which has its center aligned with the center of the cross-bore. Positioned within this groove are a pair of C-shaped inserts, the legs of which abut the ends of the piston pin to prevent axial movement of the pin within the cylindrical body. The C-shaped inserts cooperate with the pin to form a closed loop having a circumferential length which is larger than the circumferential length of the cylinder body. In addition, a portion of each of the C-shaped inserts is in constant contact with a cylinder wall. The C-shaped inserts are constructed of a material having a thermal expansion which is similar to the thermal expansion of the cylinder wall and less than the thermal expansion of the cylindrical body. These features cooperate together to insure that constant contact is maintained between the inserts and the cylinder wall at both cold and hot operating conditions thereby minimizing the presence of piston slap within the cylinders of an engine. The reduction of piston slap will minimize the noise of the engine and greatly reduce the amount of cavitation experienced on the outside of the cylinder wall.

12 Claims, 3 Drawing Figures

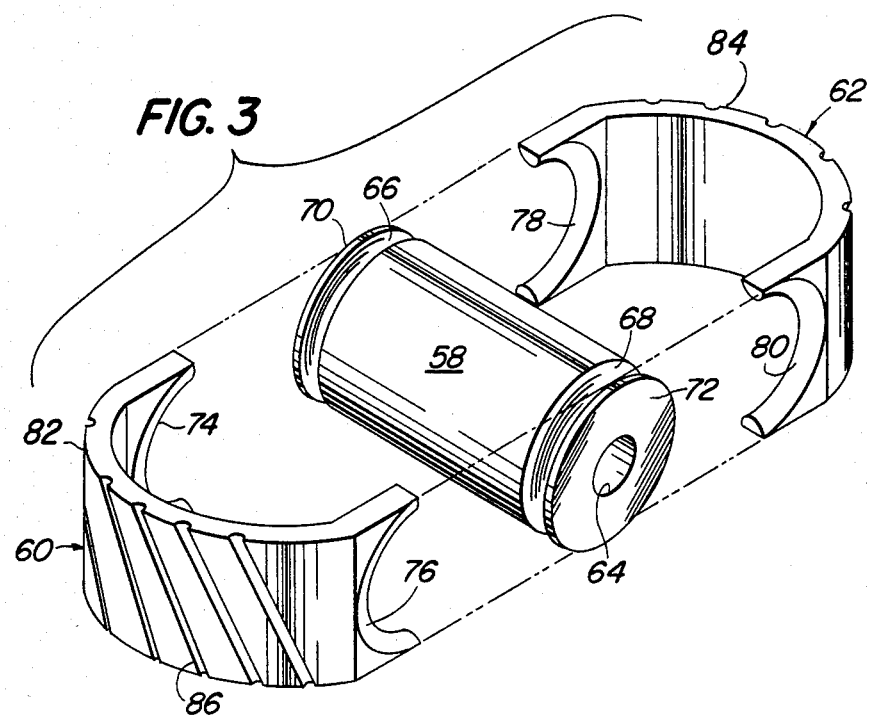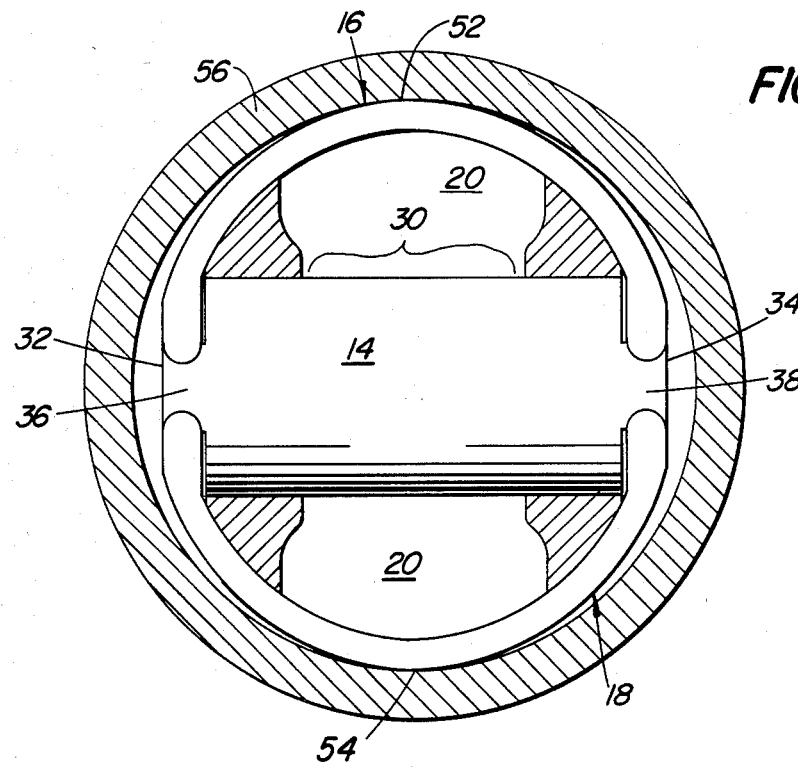

4,508,019

REDUCED IMPACT PISTON ASSEMBLY

FIELD OF THE INVENTION

This invention relates to a reduced impact piston assembly for internal combustion engines and more particularly to a reduced impact piston assembly which will reduce engine noise and reduce the side impact force of the piston against a cylinder wall.

BACKGROUND OF THE INVENTION

It is known in the industry that reciprocating pistons for internal combustion engines are subject to lateral play or side thrusts due to the necessary clearance between the piston and the surrounding cylinder wall or liner and the angularity of the piston rod. Impact between the piston and the cylinder wall or liner, due to side thrusts, is commonly known as piston slap which provides objectionable noise to an engine. Piston slap is most severe at cold operating temperatures wherein the maximum clearance between the piston and the cylinder wall or liner is realized. As the engine temperature increases and the piston expands, the clearance is reduced and the severity of piston slap is reduced. However, due to the difficulty of controlling the dimensions of the piston and the cylinder wall to maintain exactly optimum (or minimum) clearance at the maximum temperature, a small amount of clearance must be designed into the assembly. Thus, piston slap can be prominent at high operating temperatures as well. In addition to the noise created by the slapping of the piston against the cylinder wall or liner, a second problem is that cavitation can occur on the outside surface of the cylinder wall or liner. Cavitation occurs when the cylinder wall or liner vibrates due to the impact of the piston against it, thereby creating compression waves in the coolant. Each compression wave is followed by a rarefaction wave. The result is positive to negative pressure reversals in the liquid which can occur from a few hundred to several thousand times per second depending on the condition of the engine. These pressure reversals cause the formation and subsequent collapse of cavities in the liquid. During the negative portion of the pressure oscillation, gas and vapor filled cavities in the colant nucleate and grow. When the growing cavity is subjected to the high pressure portion of the cycle, its growth is arrested or reversed. The cavities then either oscillate or implode. Those cavities which implode release large localized hydraulic pressures onto the outside surface of the cylinder wall and cause a pitting action.

Various prior art patents which sought to overcome the piston slap problem are U.S. Pat. Nos. 2,208,782 issued to J. Workman on July 23, 1940; 2,049,922 issued to G. C. Nienow on Aug. 4, 1936; 2,966,382 issued to E. R. Olsen on Dec. 27, 1960; 3,115,070 issued to Chi M. Tsang on Dec. 24, 1963 and 4,158,328 issued to Beardmore on June 19, 1979. These patents all use some type of an insert or positioning means inserted into the body of the piston to maintain a portion of the piston in engagement with the cylinder wall or liner. Although the teaching of these patents may alleviate the piston slap problem to a certain degree, there is still a desire to come up with an improved method. In addition, future internal combustion engines will most likely make use of insulated pistons having a greater mass and weight than current pistons. The increased mass and weight will result in even higher piston impact forces and therefore piston slap will be more prominent and detrimental to the engine.

Now a reduced impact piston assembly has been invented which will minimize the piston slap problem in both current and a future engine cylinders.

SUMMARY OF THE INVENTION

Briefly, this invention relates to a reduced impact piston assembly which includes a cylindrical body having a cavity formed therein and a bore which is formed through the body and intersects the cavity. Formed on the outside of the cylindrical body is a wide circumferential groove which is centered about the axis of the through bore. A piston pin is recieved in the bore and has an exposed intermediate portion aligned with the cavity for attachment of a connecting rod thereto. Positioned in the wide circumferential groove of the cylindrical body is a pair of C-shaped inserts, the legs of which abut the ends of the piston pin. The C-shaped inserts cooperate with the piston pin to form a closed loop having a circumferential length which is larger than the circumferential length of the cylinder body. In addition, the C-shaped inserts are constructed of a material having thermal expansion which is similar to the thermal expansion of a cylinder wall. The similarity in thermal expansions allow the inserts to be constantly in engagement with the cylinder wall thereby preventing engine slap at both cold and hot engine conditions.

The general object of this invention is to provide a reduced impact piston assembly for an internal combustion engine. A more specific object of this invention is to provide a reduced impact piston assembly which will minimize piston slap agasint a cylinder wall at both cold and hot operating conditions.

Another object of this invention is to provide a reduced impact piston assembly which will reduce cylinder liner cavitation.

Still another object of this invention is to provide a reduced impact piston assembly which is useful in engines containing insulated pistons.

A further object of this invention is to provide a reduced impact piston assembly which will reduce engine noise at both cold and hot engine conditions.

Still further an object of this invention is to provide a reduced impact piston assembly which is simple and economical to build.

Other objects and advantages of the present invention will become more apparent when considered in connection with the following description and the drawings.

BRIEF DESCRIPTION OF THE DRAWINGS

FIG. 2 is a sectional view of the piston assembly shown in FIG. 1 taken along the axis of the piston pin which is shown in full when the engine is in a cold operating condition.

FIG. 3 is an exploded perspective view of an alternative method of attaching the C-shaped inserts to the piston pin.

DETAILED DESCRIPTION OF THE PREFERRED EMBODIMENTS

Figure 1:
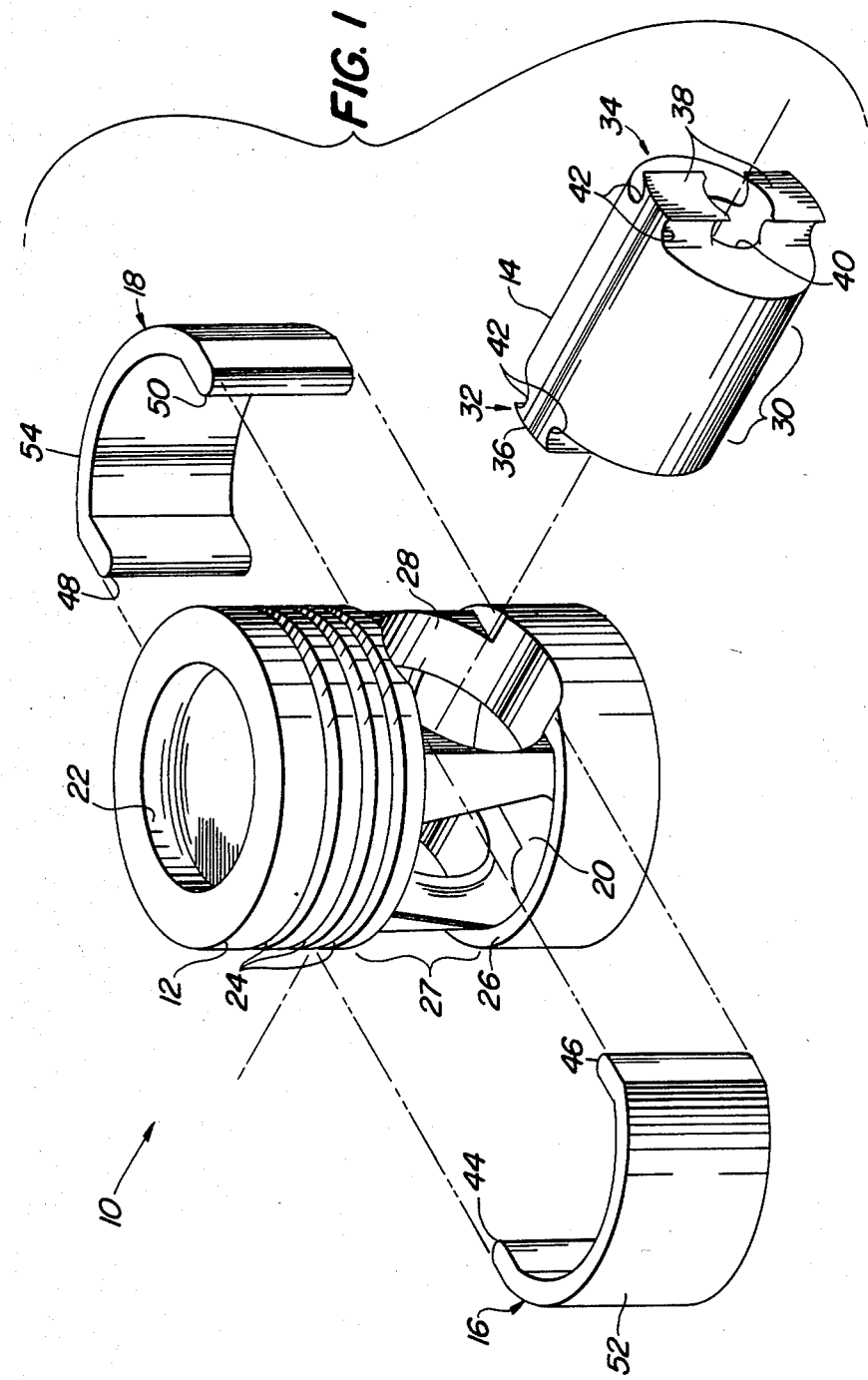
FIG. 1 is an exploded perspective view of one embodiment of the reduced impact piston assembly.

Referring to FIG. 1, a reduced impact piston assembly 10 is shown which includes a cylindrical body 12, a piston pin 14, and a pair of C-shaped inserts 16 and 18. The cylindrical body 12 contains a cavity 20 along its longitudinal axis and is preferably constructed of a light-weight material such as aluminum, having a relatively high coefficient of thermal expansion. The hollow cylindrical body 12 is shown with a combustion chamber 22 formed in its top end, with a plurality of oil ring grooves 24 formed about its outer periphery and with an enlarged groove 26 formed about its outer periphery below the oil ring grooves. It should be noted that the combustion chamber 22 and the oil ring grooves 24 are a matter of design choices and really do not affect the inventive feature of the reduced impact piston assembly 10. The cylindrical body 12 also has a piston pin bore 28 formed therein which is aligned perpendicular to the longitudinal axis of the piston assembly 10. The piston pin bore 28 receives the piston pin 14 and intersects with the cavity 20 such that an intermediate portion 30 of the piston pin 14 will be exposed for attachment to a connecting rod (not shown) which serves to connect the piston assembly 10 to the crankshaft of an engine. The piston pin bore 28 and the circumferential groove 26 are so arranged that a plane drawn through the midsection of the groove 26 would be centered on the central axis of the piston pin 14. In addition, the groove 26 has a width 27 which is approximately equal to the diameter of the piston pin 14.

The piston pin 14, which is primarily composed of a high strength material such as steel so as to resist bending loads, includes first and second ends, 32 and 34 respectively, which are irregular in shape and which define outward projecting ear members, 36 and 38 respectively. Although the ear members 36 and 38 could extend across the entire diameter of the pin 14, they are normally bifurcated by a central bore 40 which is machined into the piston 14 so as to reduce weight. Each of the ear members 36 and 38 include oppositely aligned semi-circular indentations 42 which provide a complementary surface for ends 44 and 46 of the insert 16 and for ends 48 and 50 of the insert 18. The ends 44, 46, 48 and 50 of the inserts 16 and 18 are configured so as to engage the semi-circular indentations 42. As shown in FIG. 1, the ends 44, 46, 48 and 50 of the inserts 16 and 18 are convex or rounded in shape such that when they engage the concave semi-circular indentations 42 of the piston pin 14, they will prevent the piston pin 14 from moving axially along its longitudinal axis.

Referring to FIG. 2, the pair of C-shaped inserts 16 and 18 are designed to be loosely positioned in the wide groove 26 and when their ends 44, 46, 48 and 50 abut the semi-circular indentations 42 of the piston pin 14 they form a closed loop having a circumferential length which is slightly larger than the circumferential length of the cylindrical body 12. This facilitates contact of the inserts 16 and 18 with a cylinder wall or liner 56. Preferably, a portion of an outer surface 52 of the insert 16 and a portion of an outer surface 54 of the insert 18 will be in constant contact with the cylinder wall or liner 56 during both cold and hot operating temperatures. It should be noted that FIG. 2 is shown as exaggerating the clearance between the ends 32 and 36 of the piston pin 14 and the cylinder wall or liner 56 when in fact such clearance is on the order of a few thousandths of an inch. The clearance that is present between the inserts 16 and 18 and the cylinder wall or liner 56 permits the inserts 16 and 18 to deflect and expand into the clearance region if they are heated to a temperature higher than that of the cylinder wall or liner 56. This prevents seizure of the piston assembly 10 to the cylinder wall or liner 56.

Along with being in constant engagement with the cylinder wall or liner 56, the C-shaped inserts 16 and 18 are constructed of a material which provides thermal expansion similar to that of the cylinder wall or liner 56. Preferably, the C-shaped inserts 16 and 18 are constructed of a sintered iron material which is similar to cast iron and may also contain small quantities of copper and other metals such that the thermal expansion of the C-shaped inserts 16 and 18 is approximately equal to that of the cylinder wall or liner 56. Furthermore, the thermal expansion of the C-shaped inserts 16 and 18 is less than the thermal expansion of the cylindrical body 12. This factor ensures that the C-shaped inserts 16 and 18 will always be in contact with the cylinder wall or liner 56 and will thereby minimize piston slap during both cold and hot engine operating conditions. By reducing or essentially eliminating piston slap within an engine, one can better control the noise output of the engine and also eliminate or reduce the amount of cavitation caused by the vibration of the cylinder wall or liner 56 against the cooling fluid which surrounds the outside of the cylinder wall or liner 56. Also the elimination or reduction of piston slap will permit the use of heavier materials having a greater mass for the piston itself. This is particularly advantageous when one considers that future pistons may be constructed of a heavier type of material such as ceramic.

Referring now to FIG. 3, a second embodiment for a piston pin 58 and a pair of C-shaped inserts 60 and 62 is shown. In this embodiment, the piston pin 58 has a central bore 64 formed therein to reduce its weight and also has a pair of circular grooves 66 and 68. The groove 66 is formed about a first end 70 and the groove 68 is formed about a second end 72. The ends 70 and 72 are preferably flat and do not contact any portion of an adjacent cylinder wall or liner. The circular grooves 66 and 68 engage with concave shaped ends 74 and 76 of the insert 60 and with concave shaped ends 78 and 80 of the insert 62. In this embodiment, it is possible for the piston pin 58 to rotate relative to the piston body while in the first embodiment, the piston pin 14 would be retained in a stationary postion relative to the piston body. Formed on outside surfaces 82 and 84 of the C-shaped inserts, 60 and 62 respectively, are one or more gutters 86 which are preferably semi-circular in cross-sectional configuration and extend across or transverse the entire height of the inserts 60 and 62. the gutters 86 serve to facilitate the transport of oil across the C-shaped inserts 60 and 62 while the piston assembly 10 is reciprocating up and down within the cylinder wall. Without the gutter 56, it is possible that oil could become trapped between the inserts 60 and 62 and the oil rings and this oil could have a tendency to blow by the oil rings up into the combustion chamber of the cylinder during the upstroke of the piston assembly 10. The gutter 86 are formed at a traverse angle of about 10 to 60 degrees with respect to the longitudinal axis of the piston assembly 10, so as to prevent scoring as the piston assembly 10 reciprocates within the cylinder wall or liner 56.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A reduced impact piston assembly comprising:
   (a) a hollow cylindrical body having a piston pin bore formed therethrough and having an annular groove formed about its outer circumference which is centered relative to the axis of said crossbore;
   (b) a piston pin received in said piston pin bore and having an exposed intermediate portion for attachment of a connecting rod thereto, said piston pin further having first and second annular grooves formed distal first and second ends thereof; and
   (c) a pair of C-shaped inserts positioned in said annular groove and adapted for constant engagement with a cylinder wall, the ends of said inserts engaging said annular grooves formed in said piston pin to prevent axial movement of said piston pin within said piston pin bore and to form a closed loop having a circumferential length which is greater than the circumferential length of said cylindrical body.

2. The reduced impact piston assembly of claim 1 wherein said C-shaped inserts are constructed of a material having thermal expansion approximately equal to that of said cylinder wall.

3. The reduced impact piston assembly of claim 1 wherein said first and second ends are flat and are distally located relative to said adjacent cylinder wall.

4. A reduced impact piston assembly comprising;
   (a) a cylindrical body having a cavity formed therein and having a piston pin bore formed therethrough which intersects said cavity, said cylindrical body further having an annular groove formed in its outer circumference which is centered on said piston pin bore;
   (b) a piston pin received in said piston pin bore and having an exposed intermediate portion aligned with said cavity for attachment of a connecting rod thereto, said piston pin further having first and second identically shaped ends which define outwardly projecting ear members, a portion of each ear member having an indentation formed therein; and
   (c) a pair of C-shaped inserts positioned in said annular groove, each having a pair of curved ends which engage with said indentations formed on said ear members thereby preventing both rotational and axial movement of said piston pin within said piston pin bore, said inserts further cooperating with said piston pin to form a closed loop having a circumferential length which is slightly larger than the circumferential length of said cylindrical body and further having thermal expansion which is less than the thermal expansion of said cylindrical body.

5. The reduced impact piston assembly of claim 4 wherein each of said C-shaped inserts has a height dimension approximately equal to the diameter of said piston pin.

6. A reduced impact piston assembly comprising:
   (a) a cylindrical body having a cavity formed therein and having a piston pin bore formed therethrough which intersects said cavity, said cylindrical body further having an annular groove formed in its outer circumference which is centered on said piston pin bore;
   (b) a hollow piston pin received in said piston pin bore and having an exposed intermediate portion for attachment of a connecting rod thereto, said piston pin further having a groove peripherally formed approximate each end; and
   (c) a pair of C-shaped inserts positioned in said annular groove of said cylindrical body and adapted for constant engagement with a cylinder wall, each leg of said C-shaped inserts having a semi-circular recess which engages with one of said grooves formed in each end of said piston pin thereby permitting said piston pin to rotate within said piston pin bore while preventing axial movement of said piston pin within said piston pin bore.

7. The reduced impact piston assembly of claim 6 wherein said C-shaped inserts are constructed of a material having thermal expansion approximately equal to that of said cylinder wall.

8. The reduced impact piston assembly of claim 7 wherein each of said C-shaped inserts has a height dimension approximately equal to the diameter of said piston pin.

9. The reduced impact piston assembly of claim 8 wherein at least one gutter is formed completely across the height of the outer surface of each of said insert for facilitating the transport of oil across said inserts.

10. The reduced impact piston assembly of claim 8 wherein a plurality of gutters are formed at an inclined angle completely across the height of the outer surface of each of said inserts for facilitating the transport of a fluid thereacross.

11. The reduced impact piston assembly of claim 6 wherein said C-shaped inserts are constructed of a material having thermal expansion which is less than the thermal expansion of said cylindrical body.

12. A reduced impact piston assembly comprising:
   (a) a cylindrical body having a cavity formed therein and having a piston pin bore formed therethrough which intersects said cavity, said cylindrical body further having an annular groove formed in its outer circumference which is centered on said piston pin bore;
   (b) a hollow piston pin received in said piston pin bore and having an exposed intermediate portion aligned within said cavity for attachment of a connecting rod thereto, said piston pin further having first and second identically shaped ends, each including a contoured projecting member; and
   (c) a pair of C-shaped inserts positioned in said annular groove and adapted for constant engagement with a cylinder wall, each leg of said C-shaped inserts having a rounded end surface which engages with one of said corresponding contoured projecting members of said piston pin thereby preventing both rotational and axial movement of said piston pin within said piston pin bore.

* * * * *